April 4, 1950  C. G. NOHRDEN  2,502,739
VEGETABLE OR FRUIT GRIPPER
Filed March 11, 1947
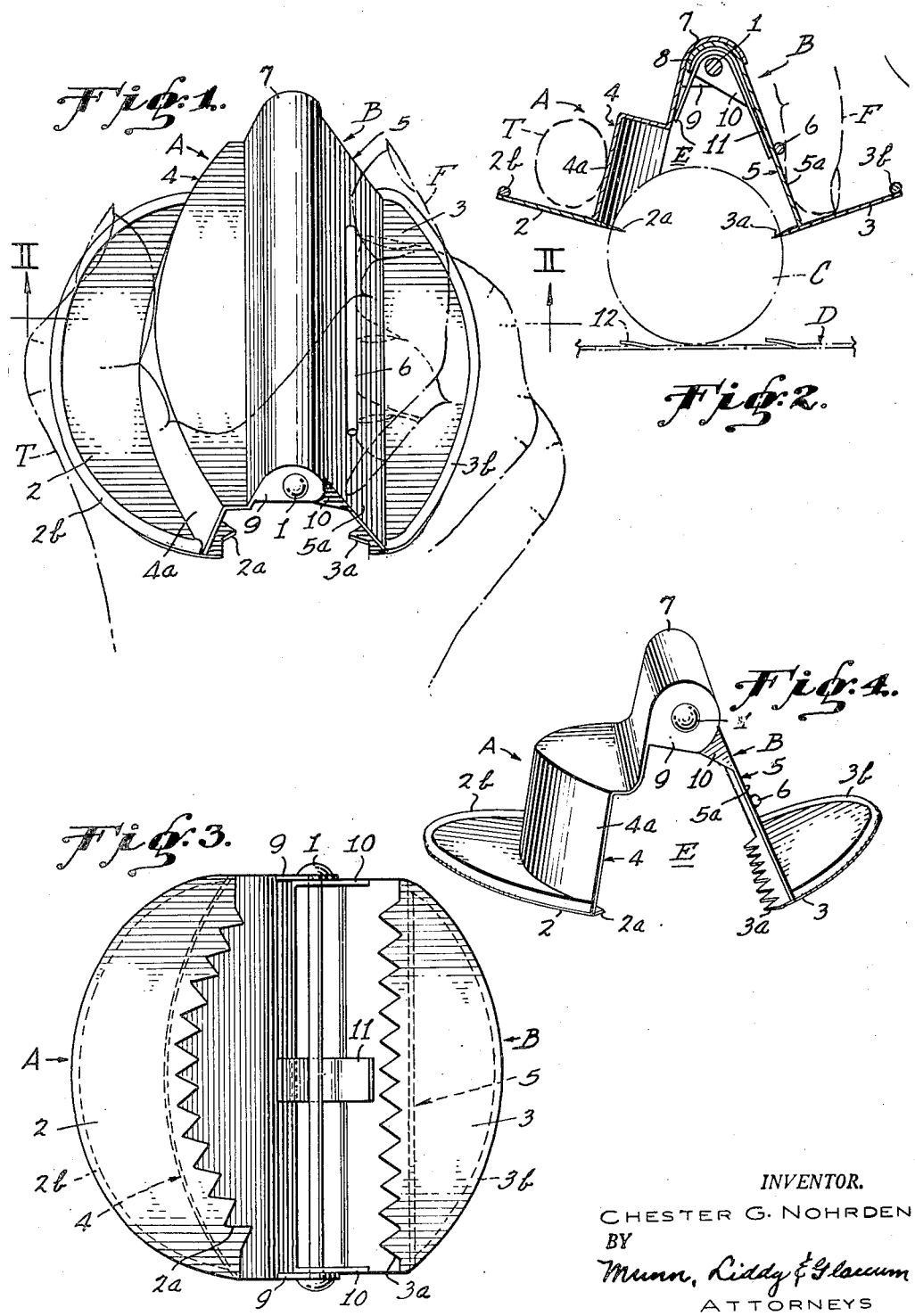
INVENTOR.
CHESTER G. NOHRDEN
BY
Munn, Liddy & Glaccum
ATTORNEYS Patented Apr. 4, 1950

2,502,739

UNITED STATES PATENT OFFICE 2,502,739

VEGETABLE OR FRUIT GRIPPER

Chester G. Nohrden, Watsonville, Calif.

Application March 11, 1947, Serial No. 733,734

2 Claims. (Cl. 146—216)

The present invention relates to improvements in a vegetable or fruit gripper. It consists of the combinations, constructions and arrangement of parts hereinafter described and claimed.

It is a well-known fact that a person's fingers and knuckles often become skinned or cut while attempting to grate vegetables and fruits on an ordinary household grater. The primary object of this invention is to provide a gripper which is adapted to hold vegetables and fruits during the grating operation, the gripper being arranged to protect a person's hand against injury while the grating is carried out.

More specifically described, I propose to provide a gripper having a pair of coacting jaws that are arranged to grip vegetables or fruits therebetween. Guards are disposed on the jaws in such a manner that they will be interposed between the grater and the thumb and finger of the person using the gripper. Thus, the grating of various vegetables and fruits, such as carrots, onions, apples, etc., may be carried on with facility and ease, without endangering the person's hand.

Other objects and advantages will appear as the specification continues, and the novel features of the invention will be set forth in the claims hereunto annexed.

For a better understanding of my invention, reference should be had to the accompanying drawing, forming part of this application, in which:

Figure 1 is a perspective view of a gripper constructed in accordance with my invention and shows it held in a person's hand, the latter being disclosed in dot-dash lines;

Figure 2 is a vertical section taken along the line II—II of Figure 1, a grater being shown therebeneath in broken lines;

Figure 3 is a bottom plan view of the grater with the jaws thereof fully opened; and Figure 4 is another perspective view looking more from the side of the gripper than the view shown in Figure 1.

While I have shown only the preferred form of my invention, it should be understood that various changes, or modifications, may be made within the scope of the appended claims without departing from the spirit thereof.

In carrying my invention into practice, I provide a pair of coacting jaws A and B, which are hinged together as at 1, by a suitable rod. The jaws are adapted to engage with various articles of food to be grated, such as vegetables, fruits, or the like, designated generally at C. When these articles are firmly held by the gripper, they may be moved over a conventional grater D for shredding or grating them.

The jaws A and B include plates 2 and 3, respectively, which are arranged in general parallel relation with one another. These plates, respectively, have teeth 2a and 3a fashioned on the confronting edges thereof. It will be noted from Figure 3 that the teeth 2a are arranged on a curve, while the teeth 3a are disposed in a straight line. The curvature of the row of teeth 2a prevents the gripped article from moving toward the outer teeth in the row. Suitable ribs 2b and 3b are provided for reinforcing the outermost margins of the plates A and B, respectively.

The plate 2 has a frame 4 fixed to and rising therefrom that is curved horizontally to provide a surface 4a against which a person's thumb T may be positioned (see Figures 1 and 2). Likewise, the plate 3 has a frame 5 secured thereto and rising therefrom. The latter frame has a flat surface 5a against which the persons fingers F may rest. A bar 6 is anchored to the surface 5a, and the finger tips of the person's hand may be positioned under this bar to prevent the fingers from slipping off of that surface during use of the gripper.

The upper ends of the frames 4 and 5 are rolled over, as at 7 and 8, respectively, so as to have a sliding fit with one another (see Figure 2). These frames are provided with perforated ears 9 and 10, respectively, through which the pivot rod of the hinge 1 extends. A leaf spring 11 is disposed within the confines of the frames 4 and 5 so as to urge them apart.

Having thus described the various parts of my gripper, the operation thereof may be briefly summarized as follows:

The person using the gripper can grasp it in one hand, as suggested in Figure 1, with the thumb T positioned along the curved surface 4a and the tips of the fingers F bearing against the flat surface 5a beneath the bar 6. A simple movement of the thumb and fingers toward one another will move the teeth 2a and 3a into gripping relation with the vegetable, fruit or the like C. The plates 2 and 3 serve as guards and are interposed between the person's hand and the grater D. As the gripped article is moved back and forth over the grater, it will be shredded or grated by the usual teeth 12 on the grater. As soon as the person relaxes pressure on the surfaces 4a and 5a, the spring 11 will urge the jaws apart.

It will be observed from Figures 2 and 4 that the frames 4 and 5 define an arch with the pivot rod of the hinge 1 disposed at the top of the arch. The arch provides a space E into which the article to be grated may project. This arrangement permits the teeth 2a and 3a to grasp the article C at points where it will be held firmly by the teeth.

I claim:

1. In an article gripper; a pair of spaced-apart plates having teeth on their confronting edges for gripping an article disposed between the plates; a frame secured to and rising from one of the plates, and having a substantially vertical surface curved horizontally to receive a portion of a person's hand grasping the gripper; the other plate also having a frame secured thereto and rising therefrom, and including a substantially flat surface against which another portion of the person's same hand may bear; the upper portions of the frames being swingably connected to each other so that the toothed plates may be pressed toward one another to grip the article therebetween; said substantially flat surface of one frame having a bar-like projection extending substantially horizontally thereacross under which part of the person's hand may be positioned; the plates projecting outwardly with respect to the frames to define underlying guards for protecting the person's hand when the gripper is moved over a grater.

2. In an article gripper; a pair of spaced-apart plates arranged in general parallel relation with one another; the confronting edges of the plates having teeth thereon for gripping an article disposed between the plates; the teeth on one plate being disposed in substantially a straight row, and the teeth on the other plate being arranged on a curve; and means for supporting the plates for movement toward and away from one another, and including frames secured to and rising from the plates; the frame having the plate thereon which defines the curved row of teeth having a substantially vertical surface curved horizontally on substantially the same curvature as the curved row of teeth.

CHESTER G. NOHRDEN.

REFERENCES CITED

The following references are of record in the file of this patent:

UNITED STATES PATENTS

| Number | Name | Date |
|---|---|---|
| D. 117,381 | Nelson | Oct. 31, 1939 |
| 660,762 | Thompson | Oct. 30, 1900 |
| 1,954,032 | Wood | Apr. 10, 1934 |
| 2,195,832 | Wagenhauser | Apr. 2, 1940 |
| 2,207,286 | Cohen | July 9, 1940 |

FOREIGN PATENTS

| Number | Country | Date |
|---|---|---|
| 237,396 | Great Britain | July 30, 1925 |
| 693,077 | Germany | July 1, 1940 |